(12) United States Patent  
Himmelmann

(10) Patent No.: US 7,948,192 B2
(45) Date of Patent: May 24, 2011

(54) DUAL REDUNDANT VARIABLE FIELD PERMANENT MAGNET DYNAMOELECTRIC MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 380 days.

(21) Appl. No.: 12/182,310

(22) Filed: Jul. 30, 2008

(65) Prior Publication Data

US 2010/0026221 A1 Feb. 4, 2010

(51) Int. Cl.
*H02P 5/00* (2006.01)

(52) U.S. Cl. ............... 318/45; 318/34; 318/51; 318/53; 361/42; 361/55; 361/31; 123/398; 123/376; 123/364; 123/375; 123/378; 416/27; 416/47

(58) Field of Classification Search ............... 318/34, 318/51, 63, 53, 98, 112, 113, 45; 310/10, 310/11, 121, 124, 112, 114, 119, 154.05; 361/42, 55, 31; 123/372, 398, 376, 364, 123/375, 378, 379, 390; 251/129.01, 129.11, 251/129.13; 416/27, 47; 60/719, 720; 74/661
See application file for complete search history.

(56) References Cited

U.S. PATENT DOCUMENTS

| | | | |
|---|---|---|---|
| 2,025,187 A | 12/1935 | Werner et al. | |
| 3,950,686 A * | 4/1976 | Randall | 318/564 |
| 4,018,683 A * | 4/1977 | Walters et al. | 210/739 |
| 4,176,633 A * | 12/1979 | McCabe | 123/360 |
| 4,346,776 A * | 8/1982 | Taplin | 180/179 |
| 4,513,235 A * | 4/1985 | Acklam et al. | 318/685 |
| 4,516,063 A * | 5/1985 | Kaye et al. | 318/685 |
| 4,543,785 A * | 10/1985 | Patrick | 60/263 |
| 4,805,396 A * | 2/1989 | Veerhusen et al. | 60/39.15 |
| 4,809,122 A | 2/1989 | Fitzner | |
| 4,920,295 A | 4/1990 | Holden et al. | |
| 4,926,628 A * | 5/1990 | Veerhusen et al. | 60/39.15 |
| 5,004,962 A * | 4/1991 | Fonss et al. | 318/85 |
| 5,254,894 A * | 10/1993 | Satake et al. | 310/114 |
| 5,281,879 A * | 1/1994 | Satake et al. | 310/114 |
| 5,408,969 A * | 4/1995 | Obaraki et al. | 123/336 |
| 5,513,493 A * | 5/1996 | Severn et al. | 60/39.281 |
| 5,627,419 A | 5/1997 | Miller | |
| 5,752,380 A | 5/1998 | Bosley et al. | |
| 5,789,877 A * | 8/1998 | Yamada et al. | 318/9 |
| 5,990,590 A * | 11/1999 | Roesel et al. | 310/113 |
| 6,161,640 A * | 12/2000 | Yamaguchi | 180/65.8 |
| 6,273,061 B1 * | 8/2001 | Hosoi | 123/333 |
| 6,404,097 B1 | 6/2002 | Pullen | |
| 6,408,824 B1 * | 6/2002 | Pacucci et al. | 123/467 |
| 6,434,473 B1 * | 8/2002 | Hattori | 701/100 |
| 6,492,753 B2 | 12/2002 | Zepp et al. | |
| 6,555,941 B1 | 4/2003 | Zepp et al. | |
| 6,612,112 B2 | 9/2003 | Gilbreth et al. | |
| 6,637,202 B2 * | 10/2003 | Koch et al. | 60/602 |
| 6,639,328 B2 | 10/2003 | Wacknov | |
| 6,647,707 B2 | 11/2003 | Dev | |
| 6,657,332 B2 | 12/2003 | Balas | |
| 6,657,348 B2 | 12/2003 | Qin et al. | |
| 6,659,080 B2 * | 12/2003 | Costin et al. | 123/399 |
| 6,732,531 B2 | 5/2004 | Dickey | |
| 6,747,372 B2 | 6/2004 | Gilbreth et al. | |

(Continued)

*Primary Examiner* — Rita Leykin
(74) *Attorney, Agent, or Firm* — Carlson Gaskey & Olds P.C.

(57) ABSTRACT

A dual redundant permanent magnet type dynamoelectric machine includes a dual flux throttle system to selectively disable one of a first motor and a second motor.

18 Claims, 8 Drawing Sheets

U.S. PATENT DOCUMENTS

| | | |
|---|---|---|
| 6,748,742 B2 | 6/2004 | Rouse et al. |
| 6,838,778 B1 | 1/2005 | Kandil et al. |
| 6,838,779 B1 | 1/2005 | Kandil et al. |
| 6,873,071 B2 | 3/2005 | Dooley |
| 6,943,478 B2 | 9/2005 | Zepp et al. |
| 6,988,357 B2 | 1/2006 | Dev |
| 7,034,500 B2 * | 4/2006 | Ionel .................. 318/772 |
| 7,042,128 B2 | 5/2006 | Zepp et al. |
| 7,140,240 B2 | 11/2006 | Gustafson et al. |
| 7,190,101 B2 | 3/2007 | Hirzel |
| 7,219,490 B2 | 5/2007 | Dev |
| 7,226,277 B2 | 6/2007 | Dooley |
| 7,268,522 B1 | 9/2007 | Baker |
| 7,298,282 B2 | 11/2007 | Gustafson et al. |
| 7,332,884 B2 | 2/2008 | Rozman et al. |
| 7,352,090 B2 | 4/2008 | Gustafson et al. |
| 7,385,332 B2 | 6/2008 | Himmelmann et al. |
| 7,508,157 B1 * | 3/2009 | Gabrys .................. 318/716 |

* cited by examiner

DUAL REDUNDANT VARIABLE FIELD PERMANENT MAGNET DYNAMOELECTRIC MACHINE

BACKGROUND

The present application relates to a dynamoelectric machine, and more particularly to a dual redundant permanent magnet dynamoelectric machine with independent deactivation.

Electric motor driven aircraft fuel pumps are prime reliable devices. If the fuel pump ceases operation, the aircraft engine will shut-down. For this reason, electric motor driven fuel pumps typically include two separate electric motors which power a common rotor assembly to provide redundant rotational power.

Historically, aircraft fuel pumps have not taken advantage of the compactness, light weight, and high efficiency of permanent magnet motors because one of the motors which power the common rotor assembly cannot be independently shut down.

SUMMARY

A dual redundant permanent magnet type dynamoelectric machine according to an exemplary aspect of the present application includes a dual flux throttle system to selectively disable one of a first motor and a second motor.

A dual redundant permanent magnet type dynamoelectric machine according to an exemplary aspect of the present application includes a common drive shaft which is powered by a first motor and a second motor and a dual flux throttle system to selectively disable one of the first motor and the second motor in response to a detected condition while the common drive shaft continues to rotate.

A method of operating a dual redundant permanent magnet type dynamoelectric machine includes axially positioning a dual flux throttle system operable to selectively disable one of a first motor and a second motor in response to a detected condition while a common drive shaft continues rotating by the other of the first motor and the second motor.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
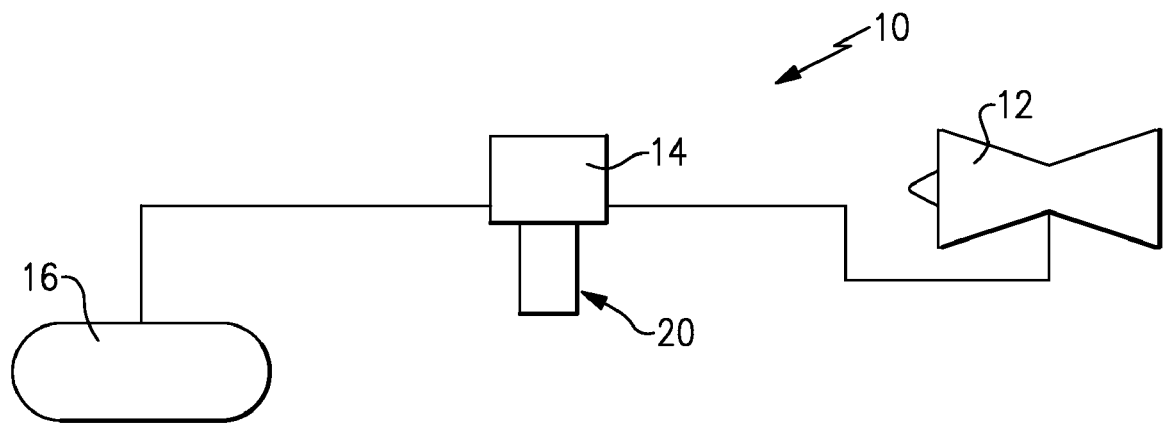
FIG. 1 is a general schematic block diagram of an energy conversion device (ECD) and an associated fuel system.

FIG. 1 illustrates a general schematic view of a fuel system 10 for an energy conversion device (ECD) 12. A fuel pump 14 communicates fuel F from a reservoir 16 such as a fuel tank to the ECD 12. The fuel F is typically a hydrocarbon such as jet fuel. One form of the ECD 12 is a gas turbine engine, and particularly such engines in aircraft.

Figure 2C:
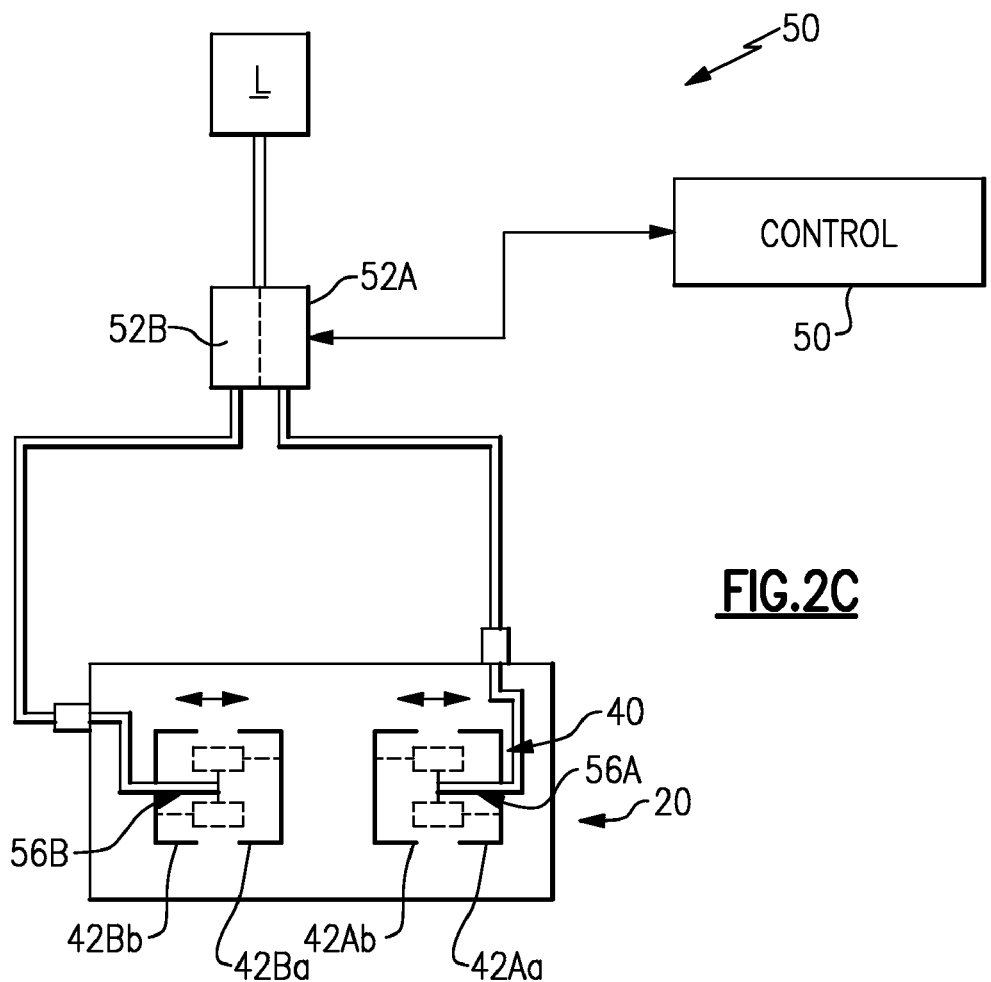
FIG. 2C is a schematic block diagram of an active control system for the dynamoelectric machine.
Figure 2A:
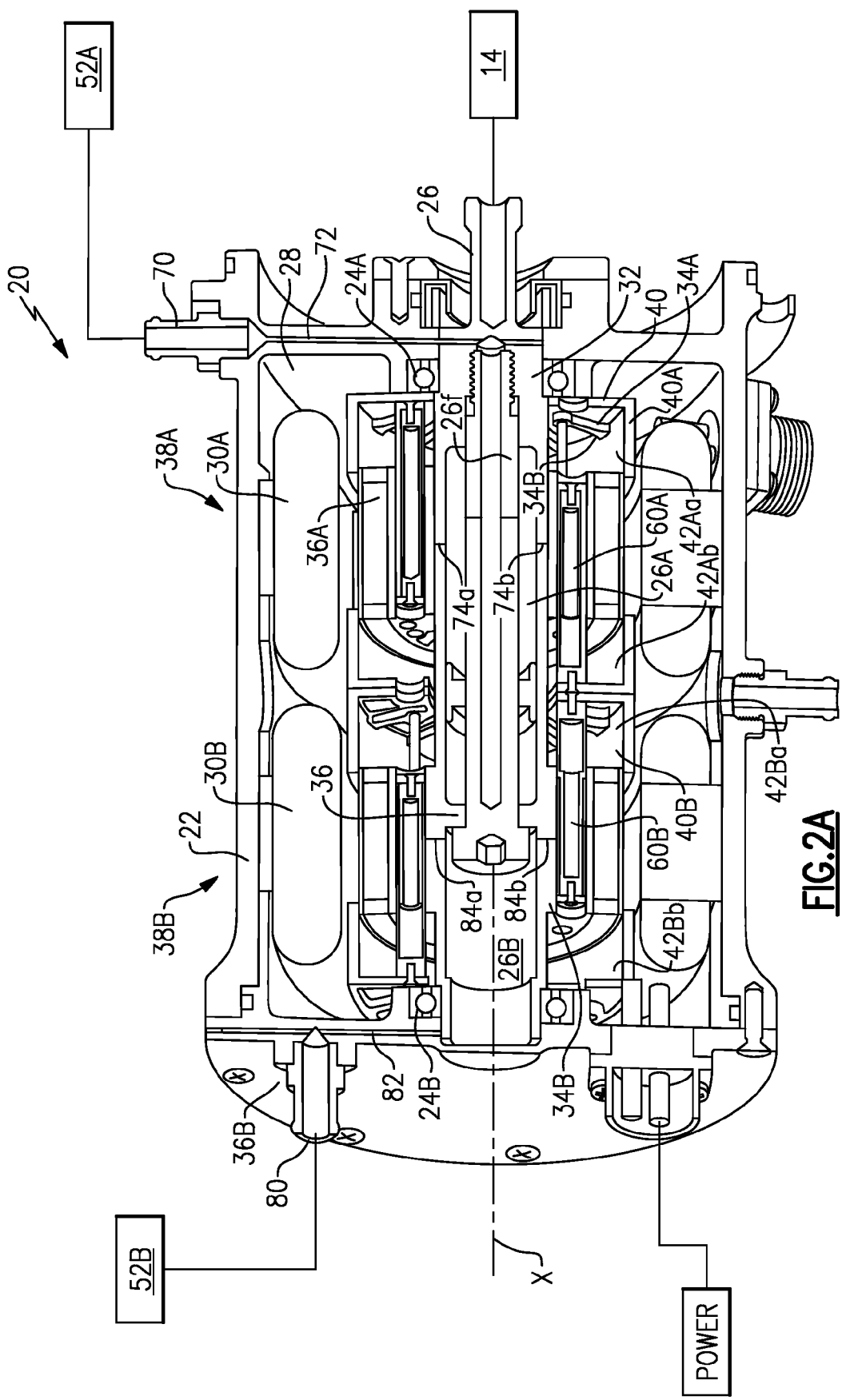
FIG. 2A is a sectional view of a dynamoelectric machine taken along a spring system.

FIG. 2A schematically illustrates a dual redundant permanent magnet type dynamoelectric machine 20 operable to power the fuel pump 14. It should be understood that although the dynamoelectric machine 20 is utilized to drive the fuel pump 14 in the disclosed embodiment, the dynamoelectric machine 20 may be utilized in various systems to perform various operations.

The dynamoelectric machine 20 includes a housing 22 that mounts a set of bearings 24A, 24B which supports a drive shaft 26 that rotates about an axis of rotation X. The dynamoelectric machine 20 illustrated in the disclosed non-limiting embodiment is of the standard type. It should be understood that other types may alternatively benefit herefrom.

The housing 22 contains a dual stator assembly 28 which has a plurality of stator poles 30A, 30B. Each plurality of stator poles 30A, 30B is of a generally cylindrical pattern which face radially inward toward the axis of rotation X. It should be understood that other shapes, such as conical or stepped, may alternatively be utilized.

A dual rotor assembly 32 is mounted to the drive shaft 26 adjacent and in general alignment with the dual stator assembly 28. The dual rotor assembly 32 includes a rotor hub 34A, 34B that mounts a first and second plurality of permanent rotor magnets 36A, 36B. In one non-limiting embodiment, the rotor hubs 34A, 34B are formed by the drive shaft 26. The first and second plurality of permanent rotor magnets 36A, 36B are in a generally cylindrical pattern facing radially outward from the axis of rotation X toward the respective first and second plurality of stator poles 30A, 30B to define a first motor 38A and a second motor 38B which drive the common drive shaft 26.

The dynamoelectric machine 20 further includes a dual flux throttle system 40 which has a first flux throttle system 40A for the first motor 38A and a second flux throttle system 40B for the second motor 38B. The first flux throttle system 40A includes a first ring 42Aa and a second ring 42Ab radially located between the respective first plurality of stator poles 30A and the first plurality of permanent rotor magnets 36A. The second flux throttle system 40B includes a first ring 42Ba and a second ring 42Bb radially located between the respective second plurality of stator poles 30B and the second plurality of permanent rotor magnets 36B.

The rings 42Aa, 42Ab, 42Ba, 42Bb are manufactured of a metallic material and rotate with the rotor assembly 32. The rings 42Aa, 42Ab and the rings 42Ba, 42Bb are axially positioned along the axis of rotation X. The dual flux throttle system 40 independently controls the effective stack length of the first motor 38A and the second motor 38B through the independent axial insertion of the rings 42Aa, 42Ab between the first plurality of stator poles 30A and the first plurality of permanent rotor magnets 36A and the rings 42Ba, 42Bb second plurality of stator poles 30B and the second plurality of permanent rotor magnets 36B.

The dual flux throttle system 40 allows the first motor 38A and the second motor 38B to be independently de-activated without the need to stop the dual rotor assembly 32. That is, one the first motor 38A or the second motor 38B may be shut-down, yet the other of the first motor 38A and the second motor 38B will continue to power the dual rotator assembly 26 and thus power the drive shaft 26. By covering the plurality of permanent rotor magnets 36A, 36B, the magnetic flux fields from the covered magnets are short circuited to adjacent magnets. With the magnetic flux field short circuited, the rotor flux cannot impinge on the respective stator polls 30A, 30B such that the voltage in the respective plurality of stator poles 30A, 30B drops to zero.

In the event of a stator winding short circuit condition, the related rings 42Aa, 42Ab or rings 42Ba, 42Bb are axially positioned between the respective plurality of permanent rotor magnets 36A, 36B and stator poles 30A, 30B to effectively eliminate the magnetically induced voltage that may otherwise continue to feed the short circuit. Redundant operation is thereby provided without the potential to feed the short circuit.

A spring system 60A, 60B mounted within each rotor hub 34A, 34B axially biases the rings 42Aa, 42Ab and rings 42Ba, 42Bb to an outboard position. That is, the respective spring system 60Aa, 60Ab provides an outboard bias to the rings 42Aa, 42Ab and spring systems 60Ba, 60Bb provides an outboard bias to the rings 42Ba, 42Bb to provide normal operation. The spring systems 60A, 60B are generally arranged around the axis of rotation X and generally parallel thereto. It should be understood that other bias directions may alternatively be provided.

Figure 2B:
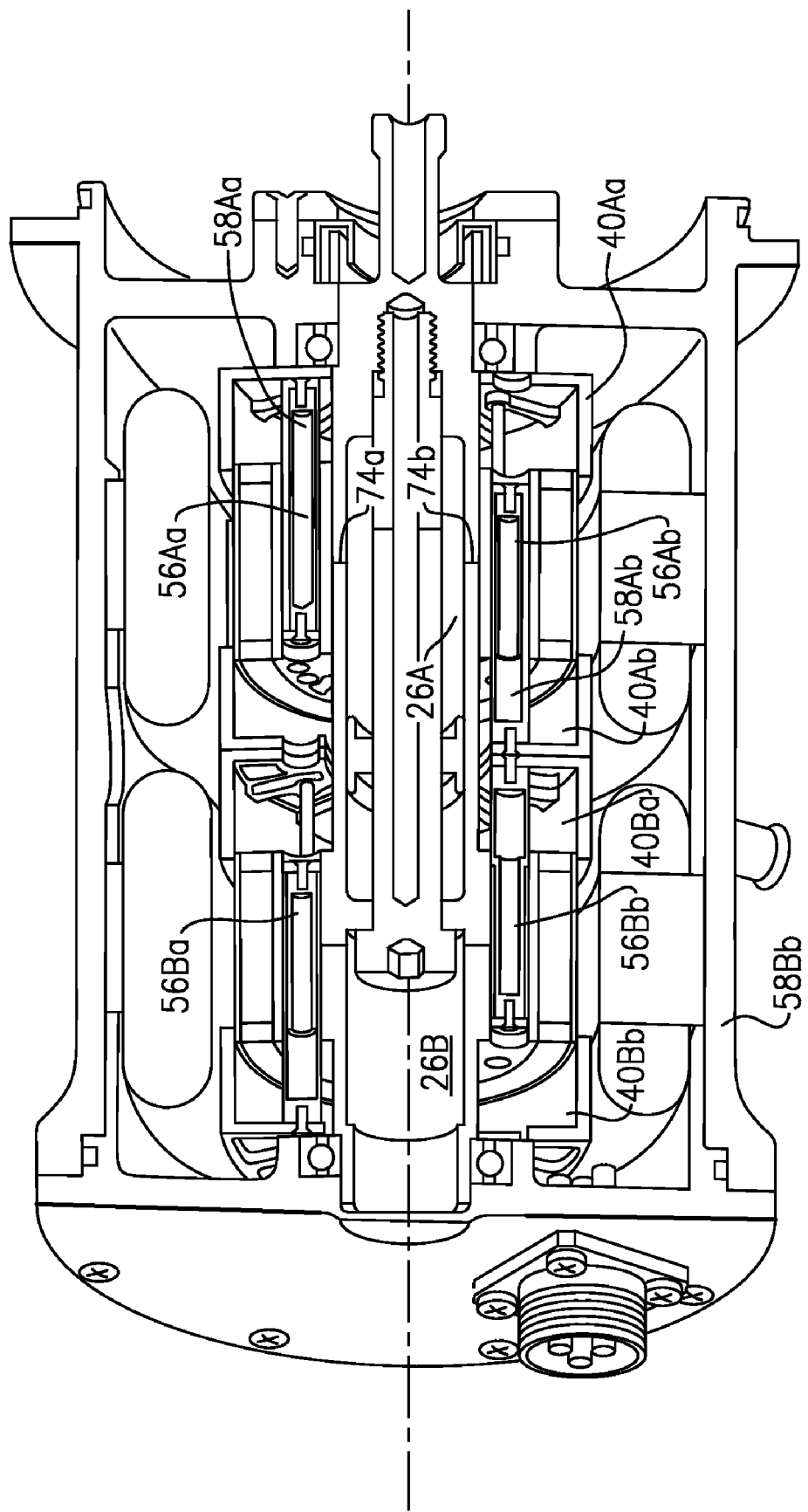
FIG. 2B is a sectional view of a dynamoelectric machine of FIG. 2A taken along a piston system.

Referring to FIG. 2B, piston 58Aa drives ring 42Aa to overcome the spring system 60Aa (FIG. 2A), piston 58Ab drives ring 42Ab to overcome the spring system 60Ab (FIG. 2A), piston 58Ba drives ring 42Ba to overcome the spring system 60Ba (FIG. 2A), and piston 58Bb drives ring 42Bba to overcome the spring system 60Bb (FIG. 2A). Pistons 58Aa, 58Ab and pistons 58Ba, 58Bb operate in concert to overcome the respective spring systems 60Aa, 60Ab, and 60Ba, 60Bb to close the first flux throttle system 40A over the first motor 38A and the second flux throttle system 40B over the second motor 38B in response to the active control system 50. Although only a single piston system 56A, 56B formed in each rotor hub 34A, 34B is illustrated for the respective first ring 42A and second ring 42B, it should be understood that the piston system 56A, 56B may include any number of pistons 58Aa, 58Ab and 58Ba and 58Bb to operate each flux throttle system 40A, 40B.

An active control system 50 which may generally include a servo-valve 52A, 52B operates the dual flux throttle system 40 in response to a controller 54. The active control system 50 controls flow of a fluid such as lubricant from a lubricant system L (illustrated schematically) to axially position the rings 42Aa, 42Ab and rings 42Ba, 42Bb though the piston system 56A, 56B formed in each rotor hub 34A, 34B. The piston systems 56A, 56B include pistons 58Aa, 58Ab and 58Ba and 58Bb that are generally arranged around the axis of rotation X and generally parallel thereto (FIG. 2).

The active control system 50 may be powered by the lubricant system L to communicate fluid to the servo-valve 52A, 52B for selective communication to the respective piston systems 56A, 56B for operation of the first flux throttle system 40A of the first motor 38A and the second flux throttle system 40B of the second motor 38B. Fluid is communicated to the piston system 56A through a control port 70 which communicates with the drive shaft 26 though a housing passages 72 (FIG. 2A). From the drive shaft 26 fluid is communicated through radial passages 74A, 74B to communicate fluid into piston passages 76A, 76B and drive pistons 58Aa, 58Ab therein. Each piston 58Aa, 58Ab is connected to the respective first ring 42Aa and the second ring 42Ab for operation of the first flux throttle system 40A to selectively drive the first ring 42Aa and the second ring 42Ab inboard toward each other. The drive shaft 26 is separated into a first chamber 26A and a second chamber 26B by a wall 27 such that the drive shaft 26 may be used to communicate fluid into the respective piston systems 56A, 56B. The drive shaft segments 26A, 26B are retained together by a fastener 26F which may be hollow to communicate lubricant therethrough.

Fluid is communicated to the piston system 56B through a control port 80 which communicates with the drive shaft 26 though a housing passages 82. From the drive shaft 26 fluid is communicated through radial passages 84A, 84B to communicate fluid into piston passages 86A, 86B and drive pistons 58Ba, 58Bb therein. Each piston 58Ba, 58Bb is connected to the respective first ring 42Ba and the second ring 42Bb for operation of the second flux throttle system 40B to drive the first ring 42Ba and the second ring 42Bb inboard toward each other.

Figure 3A:
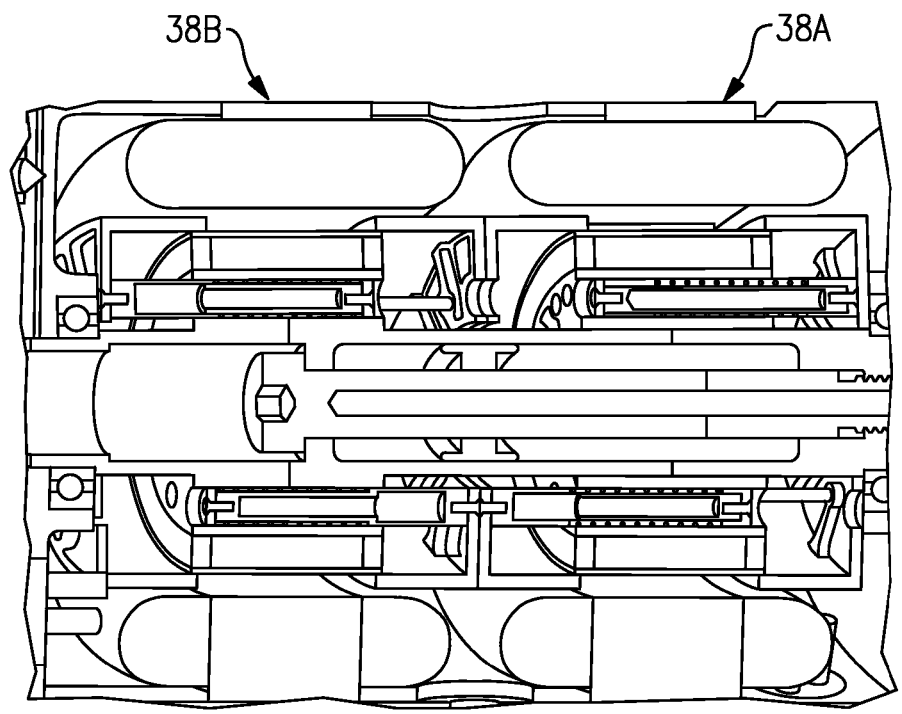
FIG. 3A is a sectional view of the dynamoelectric machine taken along a spring system with both motors in operation.
Figure 3B:
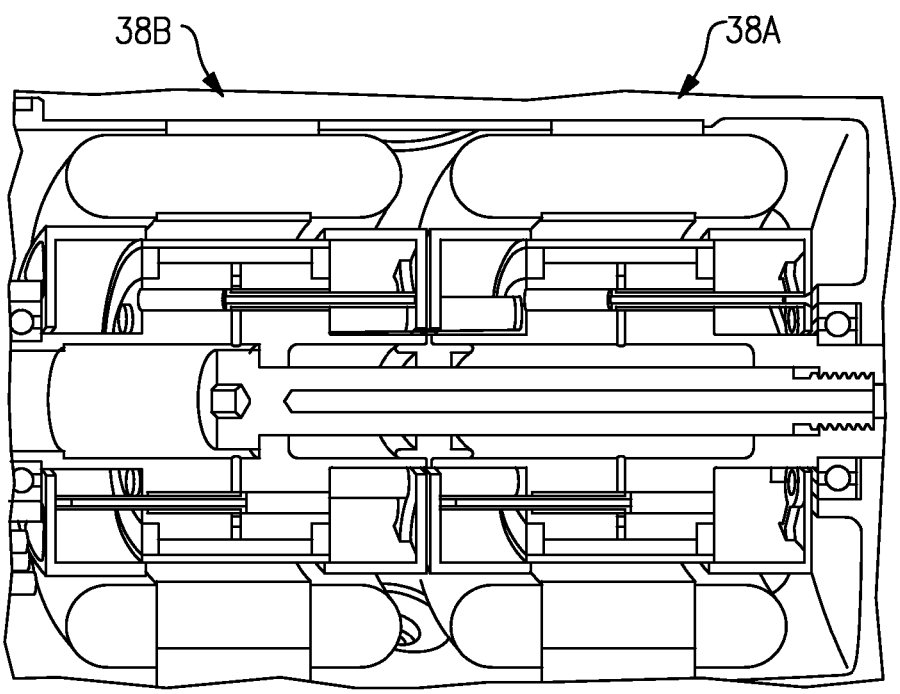
FIG. 3B is a sectional view of the dynamoelectric machine of FIG. 3A taken along a piston system.
Figure 4A:
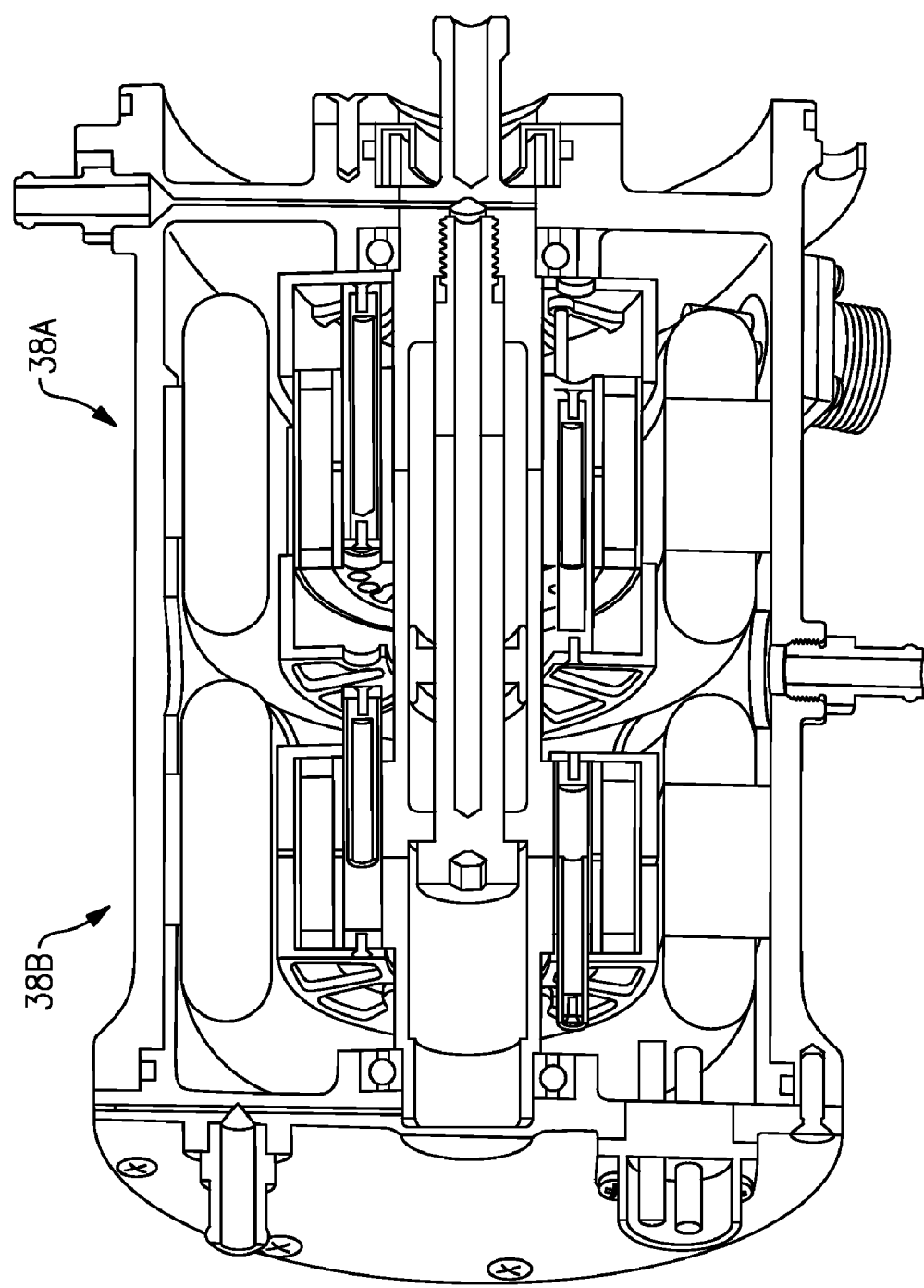
FIG. 4A is a sectional view of a dynamoelectric machine taken along a spring system with the first motor disabled and the second motor operational.
Figure 4B:
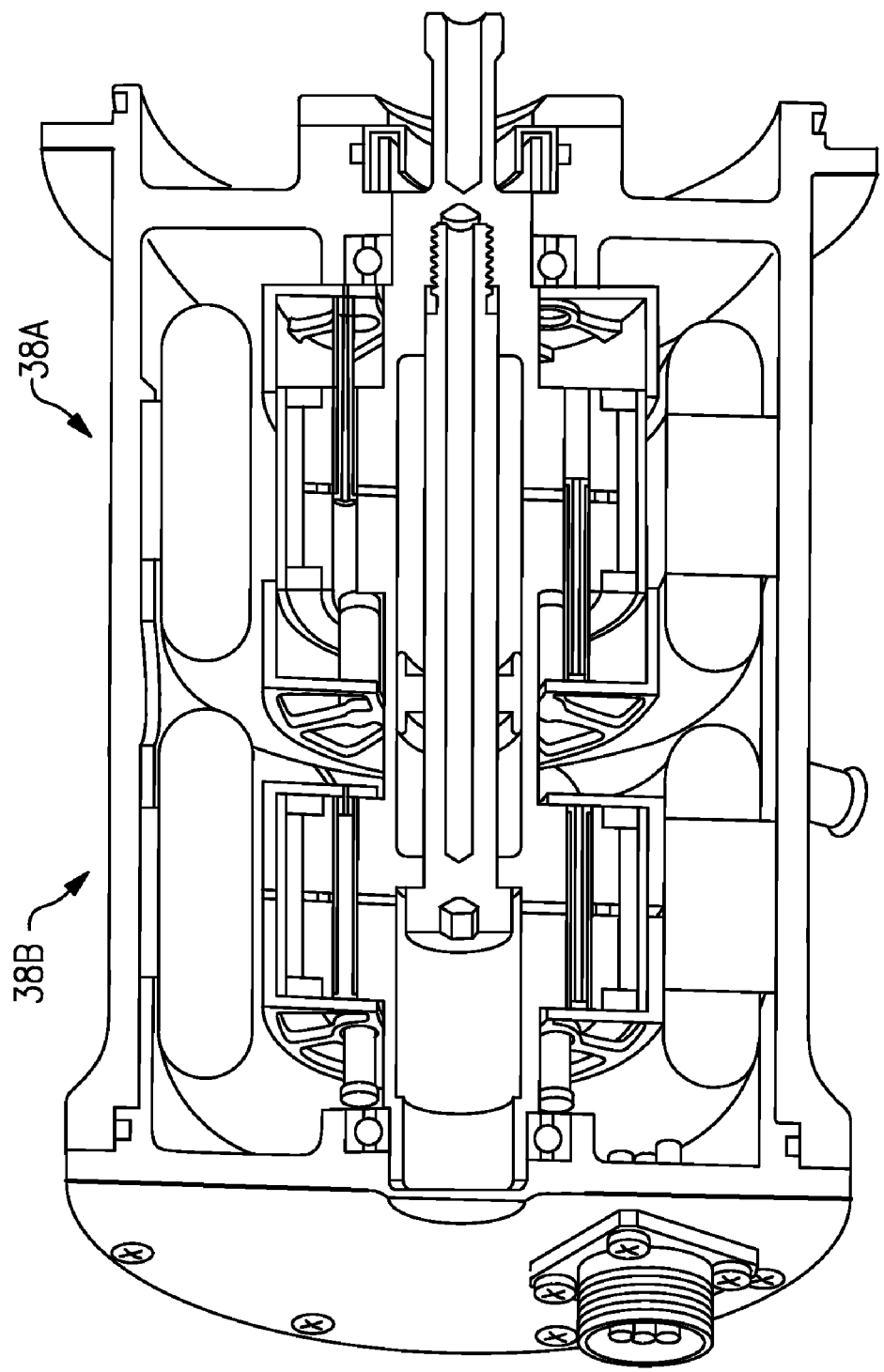
FIG. 4B is a sectional view of the dynamoelectric machine of FIG. 4A taken along a piston system.
Figure 5A:
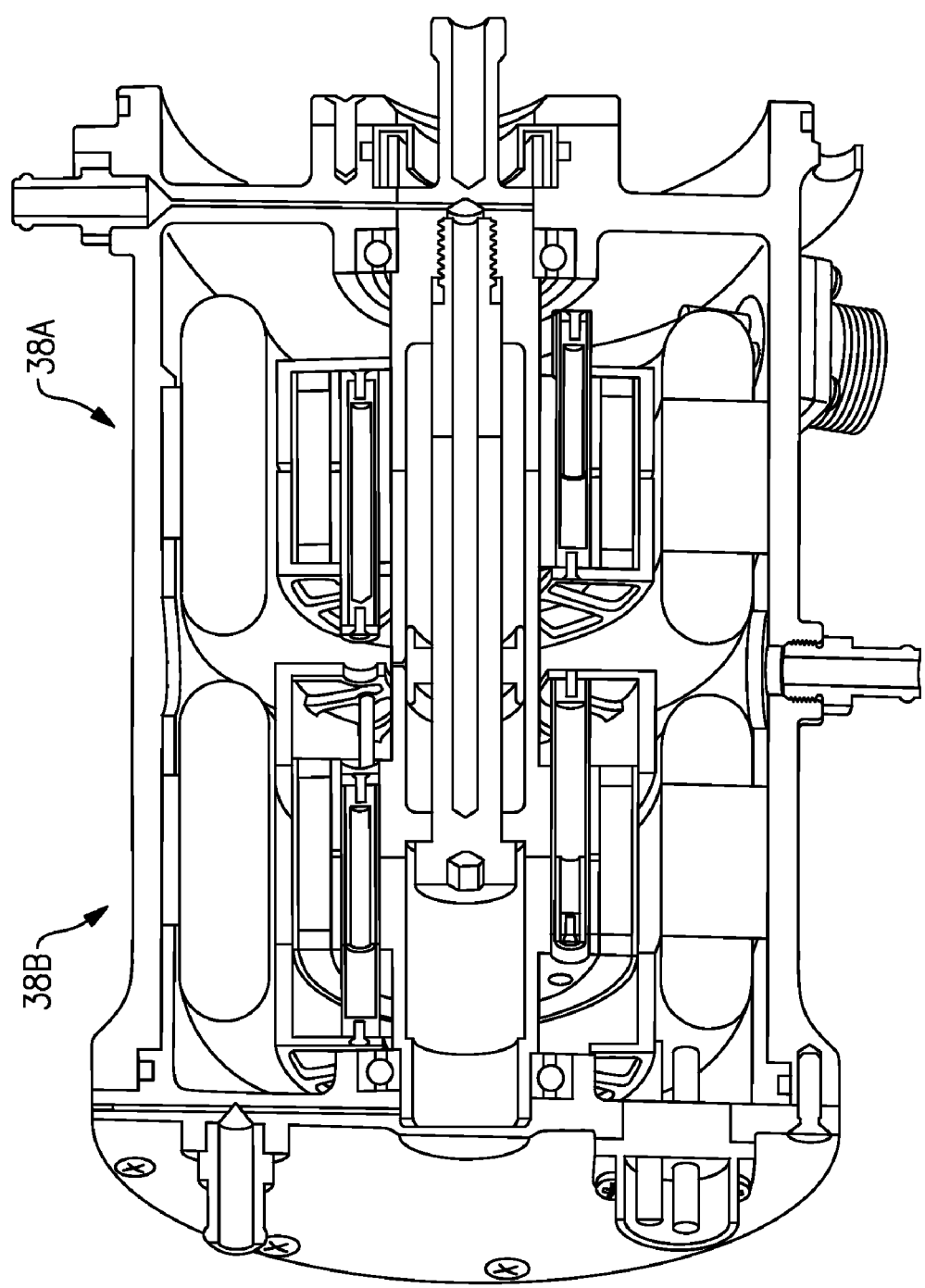
FIG. 5A is a sectional view of a dynamoelectric machine taken along a spring system with the first motor operational and the second motor disabled.
Figure 5B:
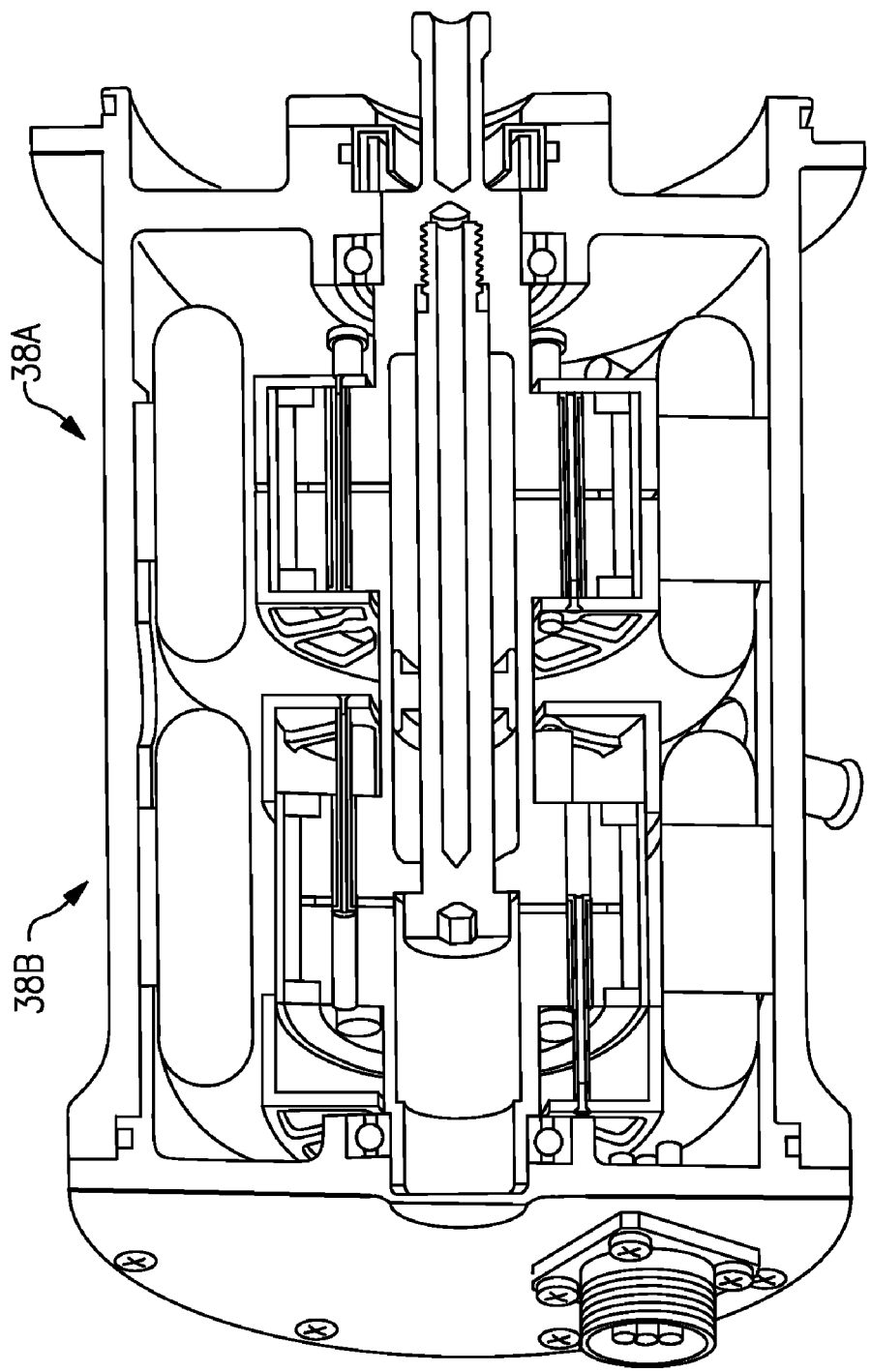
FIG. 5B is a sectional view of the dynamoelectric machine of FIG. 5A taken along a piston system.

FIGS. 3-5 illustrate example operational positions of the dual flux throttle system 40 of the dynamoelectric machine 20. FIGS. 3A and 3B illustrate the dual flux throttle system 40 with both motors 38A, 38B in operation. FIGS. 4A and 4B illustrate the dual flux throttle system 40 with the first motor 38A disabled and the second motor 38B operational. FIGS. 5A and 5B illustrate the dual flux throttle system 40 with the first motor 38A operational and the second motor 38B disabled.

It should be noted that that the controller 54 (FIG. 2C) may be utilized to selectively control the dual flux throttle system 40 to shut-down either the first motor 38A or the second motor 38B in the event of a predetermined or sensed condition such as a stator winding short circuit condition. The controller 54 may also implement other functionality such as partial axial movement to control back EMF voltage through partial movement of the first flux throttle system 40A for the first motor 38A and/or the second flux throttle system 40B for the second motor 38B.

It should be understood that the dual flux throttle system 40 may alternatively or additionally be actuated with an external actuator via a bearing and actuator arm such as a throwout bearing in a clutch system. The actuator may be, for example only, linear, rotary, hydraulic, ball screw, etc.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A dual redundant permanent magnet type dynamoelectric machine comprising:
a first motor;
a second motor; and a dual flux throttle system to selectively disable one of said first motor and said second motor, said dual flux throttle system includes a first ring and a second ring for operation of a first flux throttle system relative said first motor and a first ring and a second ring for operation of a second flux throttle system relative said second motor.

2. The dynamoelectric machine as recited in claim 1, further comprising an active control system which selectively disables either said first motor or said second motor in response to a detected condition.

3. The dynamoelectric machine as recited in claim 2, wherein said detected condition includes a short circuit.

4. The dynamoelectric machine as recited in claim 1, wherein said first motor and said second motor power a common drive shaft.

5. The dynamoelectric machine as recited in claim 1, wherein said first flux throttle system includes a first piston system to operate said first ring and said second ring of said first motor, and said second flux throttle system includes a second piston system to operate said first ring and said second ring of said second motor.

6. The dynamoelectric machine as recited in claim 5, wherein said first flux throttle system includes a first spring system to bias said first ring and said second ring of said first motor, and said second flux throttle system includes a second spring system to bias said first ring and said second ring of said second motor.

7. The dynamoelectric machine as recited in claim 6, wherein said first spring system biases said first ring and said second ring of said first flux throttle system to an outboard position, and said second spring system biases said first ring and said second ring of said second flux throttle system to an outboard position.

8. The dynamoelectric machine as recited in claim 7, wherein said first piston system operates to selectively overcome said first spring system independently of said second piston system, said second piston system operates to selectively overcome said second spring system independent of said first piston system.

9. The dynamoelectric machine as recited in claim 8, wherein said first piston system, said second piston system, said first spring system and said second spring system are located within a common drive shaft which is powered by said first motor and said second motor.

10. The dynamoelectric machine as recited in claim 9, wherein said common drive shaft powers a fuel pump.

11. A dual redundant permanent magnet type dynamoelectric machine comprising:
a first motor;
a second motor;
a common drive shaft powered by said first motor and said second motor; and
a dual flux throttle system to selectively disable one of said first motor and said second motor in response to a detected condition while said common drive shaft is rotated by the other of said first motor and said second motor, said dual flux throttle system includes a first ring and a second ring for operation of a first flux throttle system relative said first motor and a first ring and a second ring for operation of a second flux throttle system relative said second motor.

12. The dynamoelectric machine as recited in claim 11, further comprising an active control system which communicates with said dual flux throttle system.

13. The dynamoelectric machine as recited in claim 12, wherein said active control system is operable to control a fluid flow to said dual flux throttle system.

14. A method of operating a dual redundant permanent magnet type dynamoelectric machine comprising:
axially positioning a first ring and a second ring between a stator assembly and a rotor assembly of a first motor and axially positioning a first ring and a second ring between a stator assembly and a rotor assembly of a second motor to selectively disable one of the first motor and the second motor in response to a detected condition while continuing to rotate a common drive shaft by the other of the first motor and the second motor.

15. A method as recited in claim 14, further comprising:
electrically removing one of the first motor and the second motor while the other of the first motor and the second motor continues to rotate the common drive shaft.

16. A method of operating a dual redundant permanent magnet type dynamoelectric machine comprising:
axially positioning a dual flux throttle system operable to selectively disable one of a first motor and a second motor in response to a detected condition while the other of the first motor and the second motor continues rotating a common drive shaft; and
overcoming a spring bias of the dual flux throttle system to disable one of the first motor and the second motor.

17. A method as recited in claim 14, further comprising:
disabling one of the first motor or the second motor in response to a short circuit.

18. A dual redundant permanent magnet type dynamoelectric machine comprising:
a first motor;
a second motor; and
a spring bias of a dual flux throttle system to disable one of said first motor and said second motor in response to a detected condition while a common drive shaft is rotatable by the other of said first motor and said second motor.

* * * * *